US012609253B2

(12) United States Patent
Tejeda

(10) Patent No.: US 12,609,253 B2
(45) Date of Patent: Apr. 21, 2026

(54) SWITCH ASSEMBLY WITH PIVOTABLE SWITCH COVER

(71) Applicant: Pass & Seymour, Inc., Syracuse, NY (US)

(72) Inventor: Miguel Ángel Castañeda Tejeda, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 88 days.

(21) Appl. No.: 17/981,992

(22) Filed: Nov. 7, 2022

(65) Prior Publication Data

US 2024/0153718 A1 May 9, 2024

(51) Int. Cl.
*H01H 9/02* (2006.01)

(52) U.S. Cl.
CPC ........ *H01H 9/0264* (2013.01); *H01H 9/0207* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20; H01H 21/04; H01H 25/04; H01H 13/00; H01H 9/0264; H01H 9/0207
See application file for complete search history.

(56) References Cited

U.S. PATENT DOCUMENTS

| | | | | |
|---|---|---|---|---|
| 7,572,976 | B1 | 8/2009 | Merrill | |
| 8,279,092 | B2 * | 10/2012 | Vanhelle | H01H 23/143 341/20 |
| 8,388,371 | B2 | 3/2013 | Gorman | |
| 8,481,879 | B2 * | 7/2013 | Dai | H01H 13/85 200/341 |
| 8,678,856 | B2 | 3/2014 | Gorman | |
| 11,209,845 | B2 | 12/2021 | Iaconis | |
| 2007/0077058 | A1 * | 4/2007 | Kontani | B60Q 1/1484 396/389 |
| 2011/0048909 | A1 * | 3/2011 | Clark | H01H 13/063 200/330 |
| 2013/0098191 | A1 * | 4/2013 | Manullang | G06F 3/0234 74/491 |
| 2021/0097851 | A1 * | 4/2021 | Lange | G06F 3/0338 |

* cited by examiner

*Primary Examiner* — Ahmed M Saeed
(74) *Attorney, Agent, or Firm* — Bond, Schoeneck & King, PLLC; Frederick J.M. Price

(57) ABSTRACT

A switch assembly includes a body including a plurality of pressable switches, and a controller configured to control a connected device according to inputs received from the plurality of pressable switches, wherein the body further includes a pin extending from a surface thereof; a switch cover including a recess formed in an interior surface for receiving the pin such that is pivotable about the pin, wherein the plurality of pressable switches are each disposed to be pressable by pivoting the switch cover about the pin.

9 Claims, 5 Drawing Sheets

SWITCH ASSEMBLY WITH PIVOTABLE SWITCH COVER

BACKGROUND OF THE INVENTION

The present invention relates to switch assemblies generally, and, more specifically, to a switch assembly with a pivotable switch covers.

BRIEF SUMMARY OF THE INVENTION

The examples described herein can be combined in any way technically possible.

According to an aspect, a switch assembly, includes: a body including a plurality of pressable switches, and a controller configured to control a connected device according to inputs received from the plurality of pressable switches, wherein the body further includes a pin extending from a surface thereof; a switch cover including a recess formed in an interior surface for receiving the pin such that is pivotable about the pin, wherein the plurality of pressable switches are each disposed to be pressable by pivoting the switch cover about the pin.

In an example, the switch cover is of a unitary construction.

In an example, the plurality of pressable switches comprise a plurality of pushbuttons.

In an example, the body further includes a switch pad module comprising a plurality of switch pads, wherein each switch pad comprises an arm being formed into the switch pad module and having an attached end and a free end, each switch pad being disposed over a respective pressable switch such that pressing the free end of the switch pad inward presses the pressable switch.

In an example, the pin extends from a surface of the switch pad module.

In an example, the controller issues a respective command to the connected device according to which of the pressable switches has been pressed.

In an example, the respective command corresponds to a preset state of the connected device.

In an example, the controller is powered by a battery.

In an example, the body is configured for installation in a wall box.

In an example, the controller controls the connected device according to a wireless connection.

BRIEF DESCRIPTION OF THE SEVERAL VIEWS OF THE DRAWING(S)

The present invention will be more fully understood and appreciated by reading the following Detailed Description in conjunction with the accompanying drawings.

DETAILED DESCRIPTION OF THE INVENTION

Aspects of the various examples and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Reference will now be made in detail to the present exemplary embodiments of the invention, examples of which are illustrated in the accompanying drawings. Wherever possible, the same reference numbers will be used throughout the drawings to refer to the same or like parts. Various parts/elements of the protective device of embodiments of the present invention are first identified below and illustrated in the accompanying drawings. Many of the parts/elements are conventional, should be understood by a person of ordinary skill in the art in conjunction with a review of this disclosure, and are not necessarily further discussed in detail beyond being identified and represented in certain Figures. The structure, configuration, and positioning with respect to other particular parts/elements/assemblies in the assembled protective wiring device as a whole, and/or functionality of other particular parts/elements/assemblies are unique and inventive. Such other parts/elements/assemblies are described in further detail below in addition to the being identified and represented in certain Figures.

Figure 1:
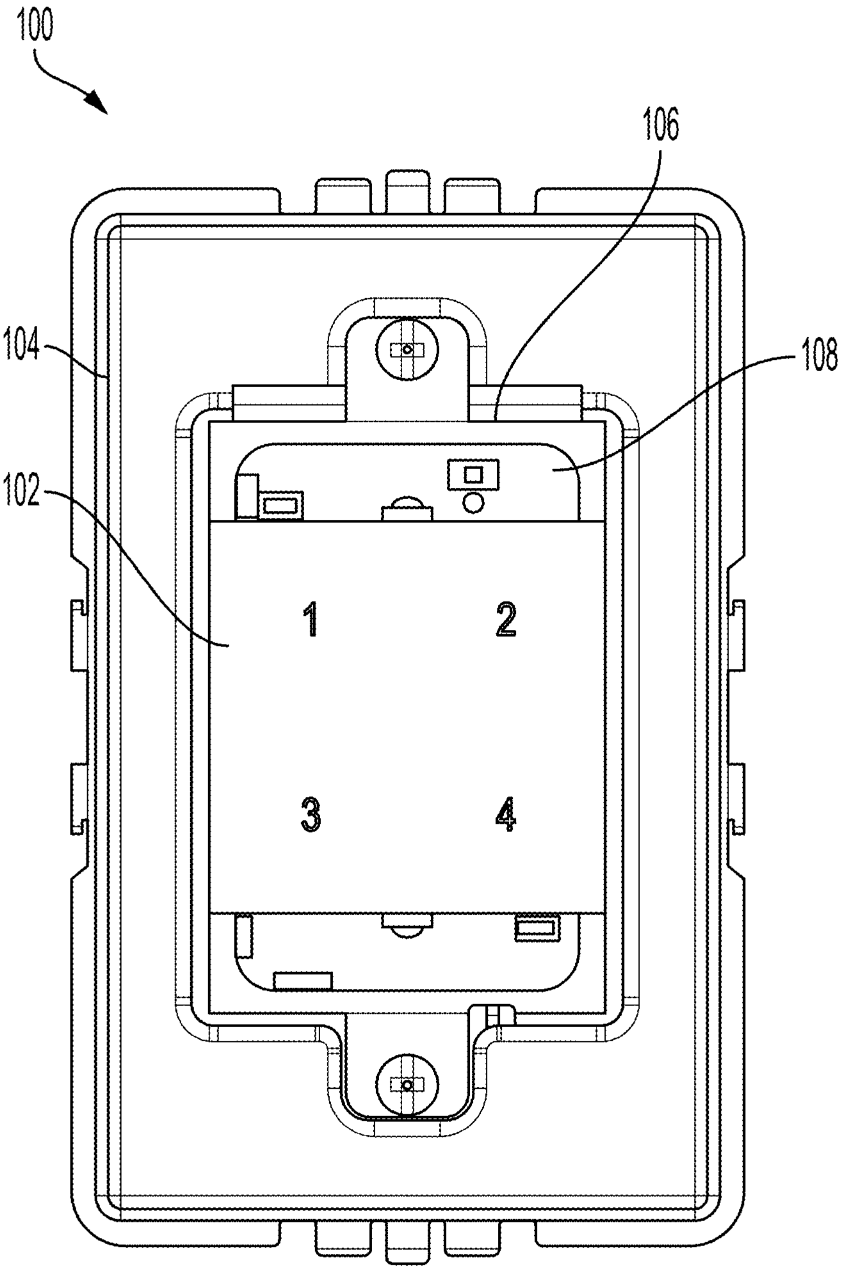
FIG. 1 depicts a front view of a switch assembly, according to an example.

FIG. 1 depicts a front view of an example switch assembly 100 featuring a switch cover 102. As shown, the switch cover 102 can permit a user to select at least one of four predetermined modes of at least one connected device. As will be described in greater detail below, switch cover 102 is pivotably mounted to the body of switch assembly 100. Pressing a corner of switch cover 102 causes it to pivot about the pin such that the bottom surface of switch cover 102 actuates a corresponding pushbutton (or other actuator) disposed beneath switch cover 102 and in electrical communication with a controller to signal the controller to adjust a state of the at least one connected device. As shown in FIG. 1, switch assembly can further include, in this example, a frame 104, for mounting, e.g., within a wall box, and a backplate 106 seated within frame 104. Switch assembly 100 further includes a switch pad module 108, disposed on backplate 106.

Figure 2:
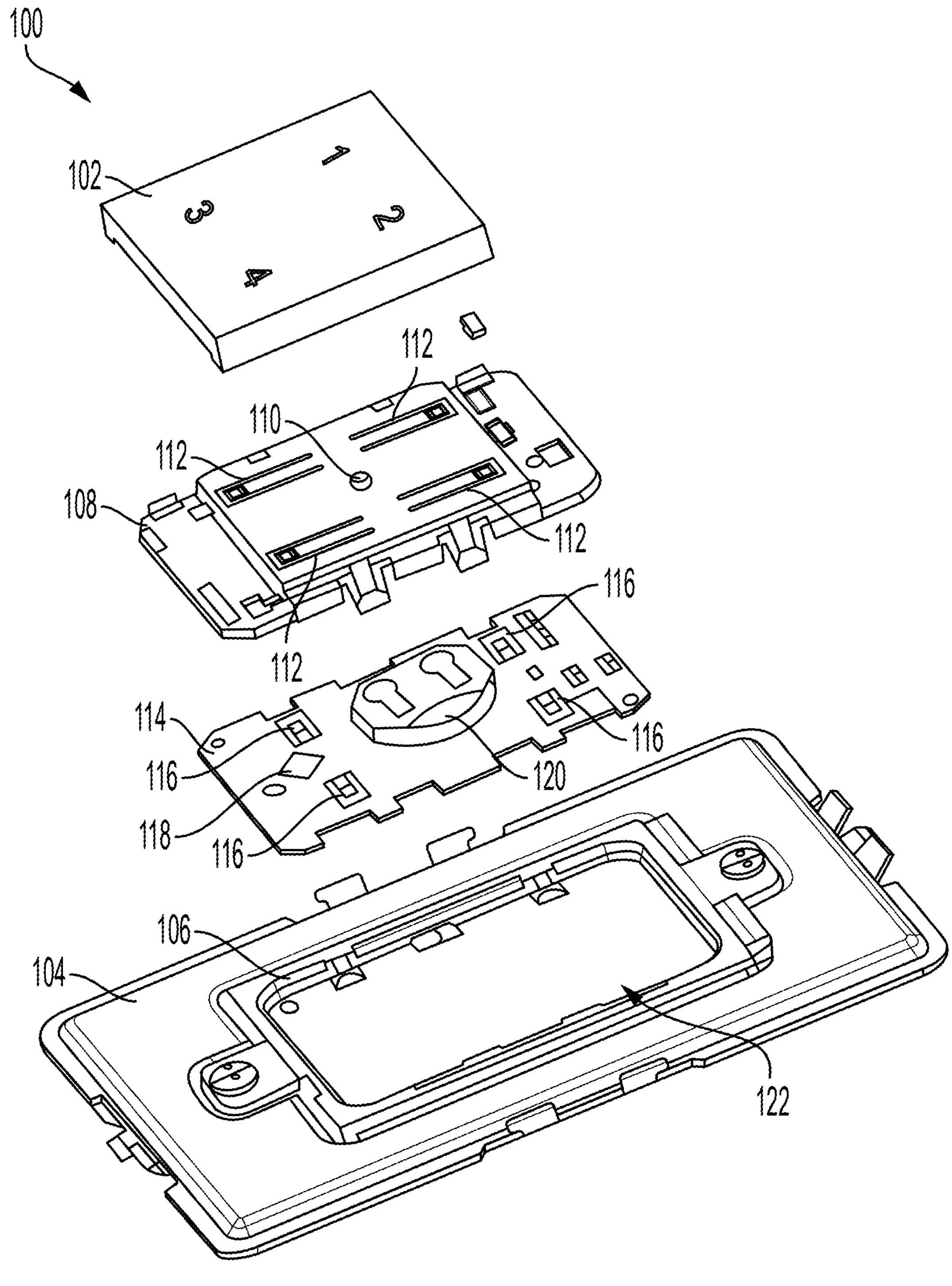
FIG. 2 depicts an exploded view of a switch assembly, according to an example.

FIG. 2 depicts an exploded view of an example switch assembly 100. Starting from the top of FIG. 2, switch assembly 100 can include switch cover 102 which is situated over switch pad module 108, such that, when assembled, switch cover 102 is pivotably mounted to pin 110 on the top surface of switch pad module 108. Switch pad module 108 further includes a set of switch pads 112. Each switch pad 112 is formed into switch pad module 112 such that one end of switch pad 112 is attached to the main body of switch pad module 108 and the other end is free. Each switch pad 112 thus forms a resilient arm that can be pressed downward at its free end and will return to a flush position with the top surface of switch pad module 108 once no longer pressed.

Figure 3A:
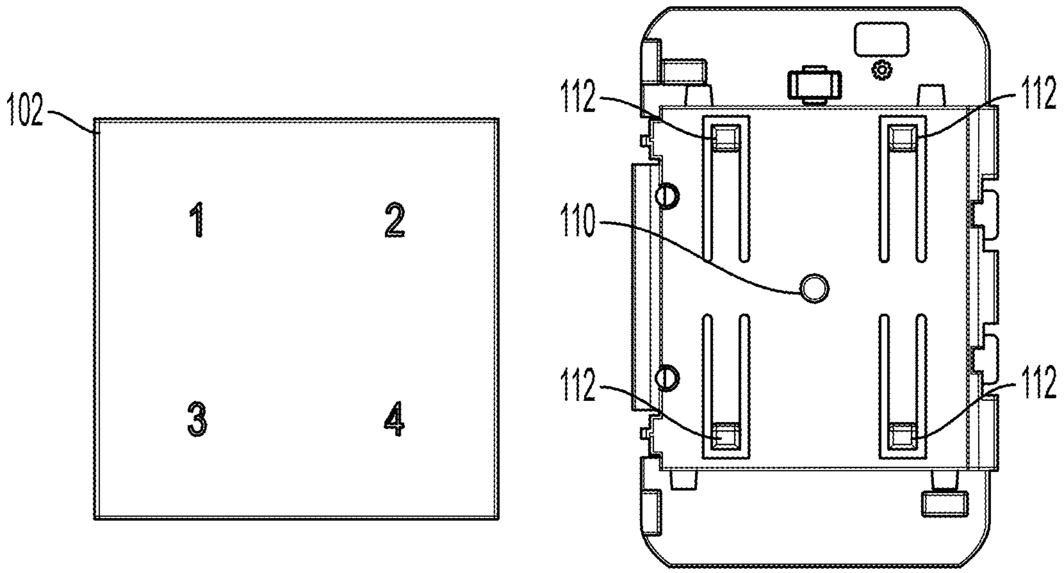
FIG. 3A depicts a front view of a switch assembly, according to an example.
Figure 3B:
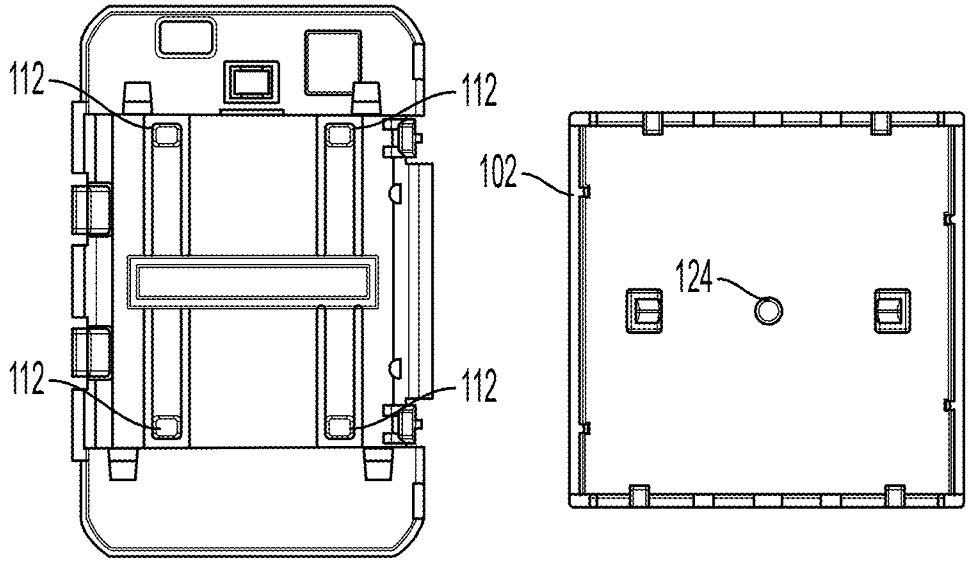
FIG. 3B depicts a front view of a switch assembly, according to an example.
Figure 4:
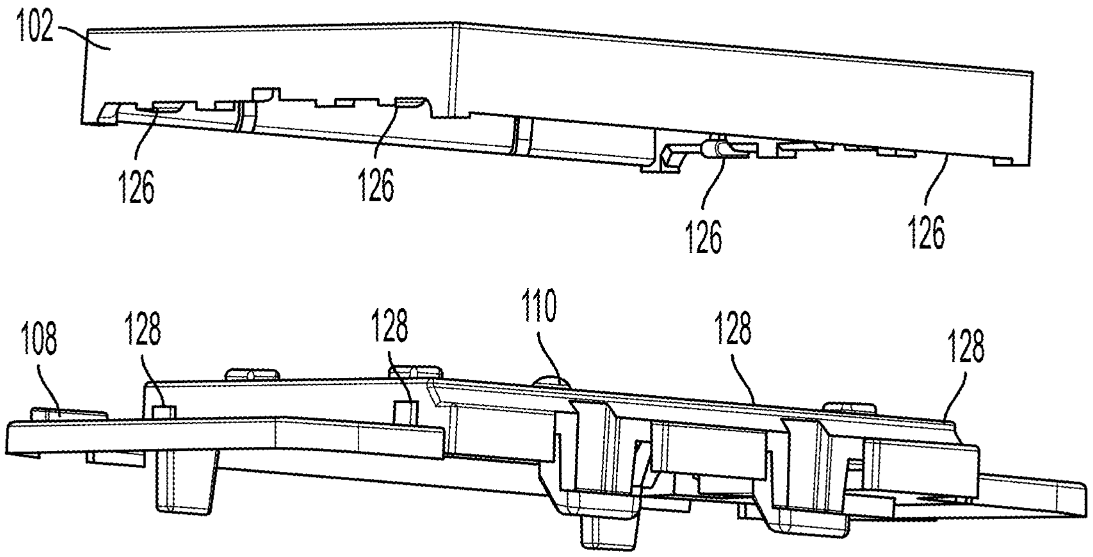
FIG. 4 depicts a front view of a switch assembly, according to an example.

The ability to press each push pushbutton 116 is conferred by pin 110, about which switch cover 102 pivots. In the example of FIG. 2, and as further shown in FIGS. 3A and 3B, pin 110 extends from the top surface of switch pad module 108 and is received into a recess 124 in the bottom surface of switch cover 102. Because the top surface of pin 110 is elevated above (and, in this example, extends out of) the top surface of switch pad module 108, switch cover 102 will pivot about pin 110 as the various sides are pressed. Further, as shown in FIG. 4, switch cover 102 can be retained together with switch pad module 108 by slots 128 in which tabs 126 fit. (In this example, the distance between tabs 126 is marginally smaller than the length of the top surface of switch pad 108 so that tabs 126 snap into slots 128.) Slots 128 are dimensioned to be larger than tabs 126, thus retaining switch cover 102 while still permitting it to pivot within a limited range. Because the various user inputs are registered from pressing a corner or side of switch cover 102, switch cover 102 need not include separate pressable buttons and can thus be of unitary construction.

In an alternative example, pin 110 can mate with a cuplike recess formed into the bottom surface of switch cover 102 to form a ball-and-socket joint and permit such pivoting. In this example, the head (top) of pin can be rounded and disposed on a stalk with a diameter less than the rounded head, allowing the cuplike recess—itself having an opening diameter that is less than the diameter of the rounded head but greater than the stalk—to grasp and retain the pin 110 against switch pad module 108. This example can obviate the need for tabs 126 and slots 128, but these can still be provided to limit the range of movement of cover 102 and to provide a redundant measure of retaining switch cover 102 together with the body of switch assembly 100.

Ordinarily, to permit the greatest freedom of movement, pin 110 is disposed in the center of switch assembly 100; however, in alternative examples, pin 110 can be disposed in any suitable location relative to the body of switch assembly 100 to permit the pivoting of switch cover 102. Likewise, recess 124 can be disposed in the center the bottom surface of switch cover 102, but, in alternative examples, can be disposed anywhere to permit the suitable pivoting of switch cover 102. In certain examples, recess 124 can be disposed anywhere along the bottom surface of switch cover 102 to permit switch cover 102 to pivot such that each respective corner or each respective side of the switch cover can be pressed nearer to the wall than the remainder of switch cover 102.

Returning to FIG. 2, printed circuit board 114 is disposed beneath switch pad module 108. Printed circuit board 114 includes, on its top surface, a set of pushbutton switches 116, each respectively disposed beneath a switch pad 112. In operation, pressing a corner of switch cover 102 presses the free end of a respective of a switch pad 112, which, in turn, presses a respective pushbutton 116. Because each switch pad 112 is resiliently formed in switch pad module 108, once the user ceases pressing switch cover 102, switch pad 112 returns to its position flush with the surface of switch pad module 108, simultaneously returning switch cover 102 to its original unpressed position.

Printed circuit board 114 further can include a controller 118 for communicating, in a wired or wireless manner, with one or more connected devices. Controller 118 can be implemented as one or more microcontrollers with any associated hardware. Controller 118 can be programmed, according to program code stored in one or more non-transitory storage media, to send one more command signals via, e.g., a transceiver or a wired input, according to the input received from one of the pushbuttons 116. In wireless examples, the command signal can be sent through any wireless protocol/technology, including, but not limited to, ZigBee standards-based protocol, Bluetooth technology, and/or Wi-Fi technology. Further the pairing of the switch assembly 100 with the connected device(s) can be accomplished via known methods. It should be understood that communicating with the remote device can occur through direct communication or through one or more intermediate device, such as through a mesh network or a hub. Electrical switches and dimmer circuits, transceivers, and the remote operation of switches through protocols such as ZigBee, Bluetooth, Wi-Fi, etc., is known in the art, and any suitable smart switch circuit can be used.

Controller 118 can further be programmed to store one or more preset modes. In the Example of FIGS. 1-3, controller 118 is programmed to store at least four preset modes, one more corresponding to a respective pushbutton 116, which, in turn, corresponds to a respective numbered corner of switch cover 102. Thus, pressing the corner of switch cover 102, presses pushbutton switch 116 signaling to controller 118 to retrieve from memory the corresponding preset for the connected device and to send the command to the connected to implement the present. For example, the four presets can each be a separate lighting presets (e.g., dim levels) for one or more connected lights. It should be understood that the presets correspond to any desired setting of a connected device. Furthermore, controller 118 can be programmed to enact changes to the state of a connected device besides presets, such as increase or decrease the dim value of a connected light, in response to the press of one of pushbutton switch 116. More generally, then, pushbutton switches 116 provide user inputs to controller 118 that can be mapped onto control signals to adjust a state of a connected device (e.g., enact a preset mode or to change a setting).

Further, although four presets are described above, it should be understood that any number of presets can be stored and implemented by controller 118. Additionally, although switch cover 102 is shown to have four numbered corners, corresponding to four presets, switch cover 102 can be shaped and dimensioned to implement any suitable number of preset selections. Alternatively, for example, switch cover 102 can have a triangular shape (three selectable presets), a pentagonal shape (five selectable presets), a hexagonal shape (six selectable presets), and so on, with each corner corresponding to a separate selectable preset. It should be understood that in the alternative examples, in which other shape switch covers are employed, the corresponding structure, in the in form of pushbuttons or switch pads, will likewise be arranged to permit the implementation of the various selectable presets. Further, it is not necessary that the number of selectable presets correspond to the number of corners of the switch cover. In alternative examples, the pushbuttons can be arranged to correspond to the center of a side of the push cover, or any other suitable location that permits a user to select the preset. The number of selectable presets also does not necessarily correspond to the number of sides or corners a particular shaped switch cover has (e.g., a four sided switch cover can implement two presets, etc.).

Further, in alternative examples, structure besides the switch pads can be employed to return switch cover 102 to its original position and to permit interaction between switch cover 102 and pushbuttons 116. Alternatively, for example, various types of springs, such as compression springs, helical springs, leaf springs, torsion springs, etc. can be used to return switch cover 102 to its original position after being pressed. Further, any other suitable intermediary structure can be positioned between switch cover and the respective pushbutton to facilitate the accurate pressing of the pushbutton. In other examples, switch cover can contact pushbuttons directly, such as with features formed into, or otherwise attached to (e.g., rods or other protrusions) the bottom surface of switch cover 102. In addition, actuators besides pushbuttons can be used to signal to controller 118 that a user has pressed a preset location (e.g., corner or side) of switch cover 102. Indeed, any form of pressable switch can be used.

Figure 5:
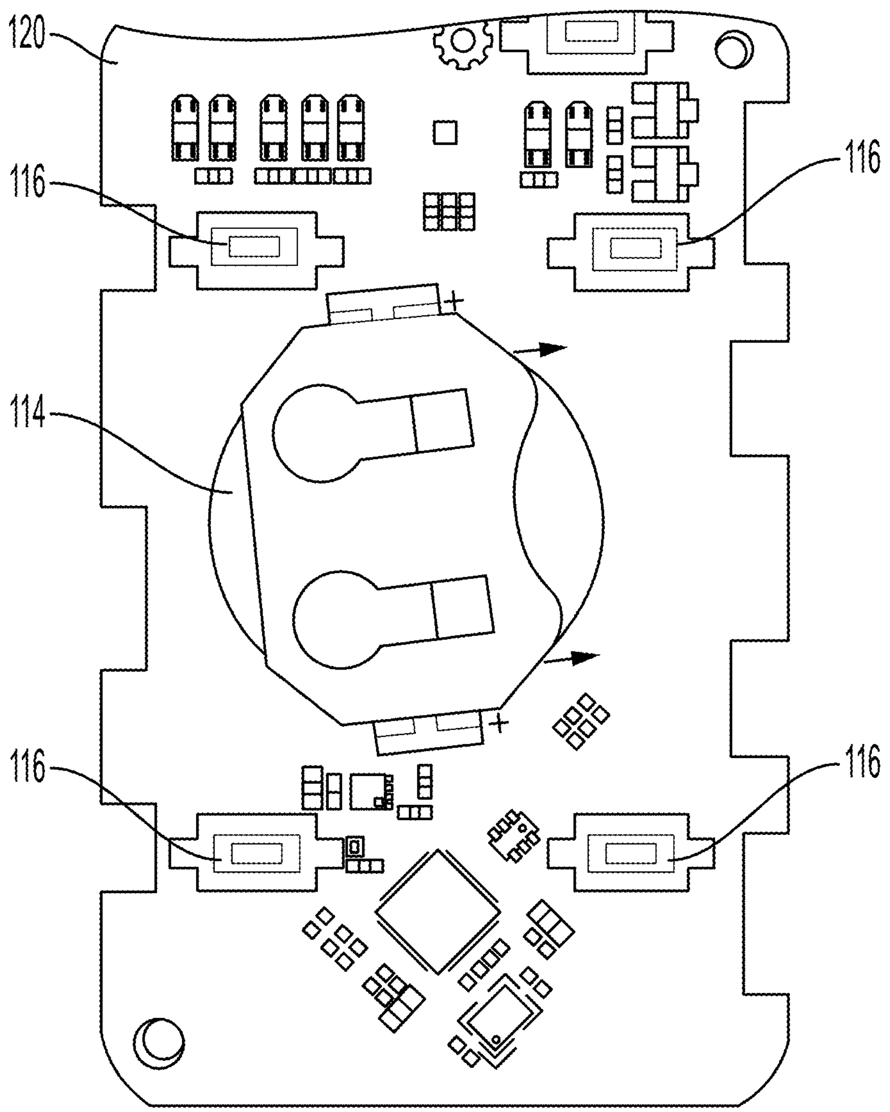
FIG. 5 depicts a front view of a printed circuit board and battery according to an example.

Continuing in FIG. 2, and as further shown in FIG. 5, battery 120 is disposed on printed circuit board 114, for powering controller 118 and any other electronic components disposed on printed circuit board 114, or elsewhere in switch assembly 100. Both printed circuit board 114 and battery 120 can be disposed in a recess 122 defined within backplate 106.

Frame 104 can further be configured to receive a wall plate, e.g., through a snap attachment. Such a wall plate is described in greater detail in U.S. Pat. No. 10,279,235 titled "Modular Electrical Wiring Device System" and in US 2020/00185898 titled "Modular electrical wiring device assembles," both of which are hereby incorporated by reference in their entirety.

In alternative examples, controller 118 can receive power from a connection to main power or any other suitable source of power. Indeed, switch cover 102 can be used on any suitable kind of electrical wiring device for which an input is used, including wiring devices mounted to a wall or within a wall box.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed.

All references, including publications, patent applications, and patents, cited herein are hereby incorporated by reference to the same extent as if each reference were individually and specifically indicated to be incorporated by reference and were set forth in its entirety herein.

All definitions, as defined and used herein, should be understood to control over dictionary definitions, definitions in documents incorporated by reference, and/or ordinary meanings of the defined terms.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A switch assembly, comprising:

a body including a plurality of pressable switches, and a controller configured to control a connected electrical wiring device according to inputs received from the plurality of pressable switches, wherein the body further includes a pin extending from a surface thereof, and a switch pad module comprising a plurality of switch pads, wherein each switch pad comprises an arm being formed into the switch pad module and having an attached end and a free end, each switch pad being disposed over a respective pressable switch such that pressing the free end of the switch pad inward presses the pressable switch;

a switch cover including a recess formed in an interior surface for receiving the pin such that is pivotable about the pin, wherein the plurality of pressable switches are each disposed to be pressable by pivoting the switch cover about the pin.

2. The switch assembly of claim 1, wherein the switch cover is of a unitary construction.

3. The switch assembly of claim 1, wherein the plurality of pressable switches comprise a plurality of pushbuttons.

4. The switch assembly of claim 1, wherein the pin extends from a surface of the switch pad module.

5. The switch assembly of claim 1, wherein the controller issues a respective command to the connected device according to which of the pressable switches has been pressed.

6. The switch assembly of claim 5, wherein the respective command corresponds to a preset state of the connected device.

7. The switch assembly of claim 1, wherein the controller is powered by a battery.

8. The switch assembly of claim 1, wherein the body is configured for installation in a wall box.

9. The switch assembly of claim 1, wherein the controller controls the connected device according to a wireless connection.

* * * * *